United States Patent [19]

Hahn et al.

[11] Patent Number: 5,062,861
[45] Date of Patent: * Nov. 5, 1991

[54] NOVEL NAVY AND BLACK DISPERSE DYE MIXTURES INCLUDING AMINO-PHENYL THIOPHENE AZO DISPERSE DYE AND RED, YELLOW OR ORANGE DISPERSE DYES

[75] Inventors: Erwin Hahn, Heidelberg; Guenter Hansen, Ludwigshafen; Karl-Heinz Etzbach, Frankenthal; Helmut Reichelt, Neustadt; Ernst Schefczik, Ludwigshafen; Helmut Degen, Frankenthal; Reinhold Krallmann, Weisenheim; Gerhard Wagenblast, Frankenthal, all of Fed. Rep. of Germany

[73] Assignee: BASF Aktiengesellschaft, Ludwigshafen, Fed. Rep. of Germany

[*] Notice: The portion of the term of this patent subsequent to Mar. 13, 2007 has been disclaimed.

[21] Appl. No.: 497,672

[22] Filed: Mar. 23, 1990

[30] Foreign Application Priority Data

Apr. 12, 1989 [DE] Fed. Rep. of Germany ....... 3911949

[51] Int. Cl.$^5$ .................. C09B 29/03; C09B 67/22; D06P 1/18; D06P 3/52
[52] U.S. Cl. ..................................... 8/639; 8/638; 8/643; 8/922
[58] Field of Search ...................... 8/638, 639

[56] References Cited

U.S. PATENT DOCUMENTS

| 4,464,181 | 8/1984 | Degen et al. | 8/639 |
| 4,472,169 | 9/1984 | Shuttleworth et al. | 8/639 |
| 4,775,748 | 10/1988 | Kluger et al. | 8/403 |
| 4,908,041 | 3/1990 | Hahn et al. | 8/638 |
| 4,912,203 | 3/1990 | Kluger et al. | 534/729 |

FOREIGN PATENT DOCUMENTS

| 1269656 | 5/1990 | Canada . |
| 166566 | 1/1986 | European Pat. Off. . |
| 201896 | 11/1986 | European Pat. Off. . |
| 362637 | 4/1990 | European Pat. Off. . |

Primary Examiner—A. Lionel Clingman
Attorney, Agent, or Firm—Oblon, Spivak, McClelland, Maier & Neustadt

[57] ABSTRACT

Navy and black dye mixtures contain one or more thiopheneazo dyes whose diazo component comes from the 2-aminothiophene series and whose coupling component comes from the aniline series and one or more dyes F whose absorption maximum is at a wavelength of from 390 to 520 nm, the proportion of the thiopheneazo dyes being from 60 to 99% by weight, based on the total weight of the thiopheneazo dyes and the dyes F in the mixture.

3 Claims, No Drawings

NOVEL NAVY AND BLACK DISPERSE DYE MIXTURES INCLUDING AMINO-PHENYL THIOPHENE AZO DISPERSE DYE AND RED, YELLOW OR ORANGE DISPERSE DYES

The present invention relates to novel navy and black dye mixtures containing one or more thiopheneazo dyes of the formula.

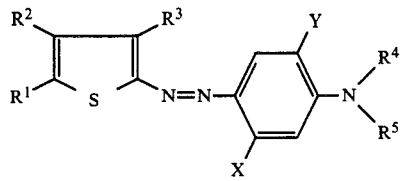

where
$R^1$ is formyl, cyano or phenylsulfonyl,
$R^2$ is halogen, $C_1-C_6$-alkoxy, substituted or unsubstituted phenoxy, $C_1-C_6$-alkylthio, phenylthio, $C_1-C_4$-alkylsulfonyl or phenylsulfonyl,
$R^3$ is cyano, $C_1-C_6$-alkoxycarbonyl, whose alkyl chain may be interrupted by one or more oxygen atoms, carbamoyl or $C_1-C_4$-monoalkyl- or -dialkyl-carbamoyl,
$R^4$ is $C_1-C_{64}$alkyl which may be substituted by hydroxyl, $C_1-C_4$-alkoxy, cyano, $C_1-C_4$-alkanoyloxy, $C_1-C_4$-alkoxycarbonyloxy, $C_1-C_4$-alkylaminocarbonyloxy, phenyl, $C_1-C_4$-alkoxycarbonyl or chlorine-, hydroxyl- $C_1-C_4$-alkoxy- or phenoxy-substituted $C_1-C_4$-alkoxycarbonyl,
$R^5$ is hydrogen or $C_1-C_6$-alkyl which is substituted by phenyl, $C_1-C_4$-alkoxycarbonyl or chlorine-, hydroxyl-, $C_1-C_4$-alkoxy- or phenoxy-substituted $C_1-C_4$-alkoxycarbonyl,
X is hydrogen, $C_1-C_4$-alkyl, $C_1-C_4$-alkoxy, chlorine, bromine or the radical $-NH-CO-R^6$, where $R^6$ is $C_1-C_4$-alkyl, which may be substituted by $C_1-C_4$-alkoxy, phenoxy, cyano, hydroxyl, chlorine or $C_1-C_4$-alkanoyloxy, or is unsubstituted or $C_1-C_4$-alkoxy-substituted phenoxy and
Y is hydrogen, $C_1-C_4$-alkyl or $C_1-C_4$-alkoxy, and
one or more F whose absorption maximum is at a wavelength of from 390 to 520 nm, the proportion of the thiopheneazo dyes being from 60 to 99% by weight, based on the total weight of the thiopheneazo dyes and the dyes F In the mixture, except dye mixtures containing
a) the dyes

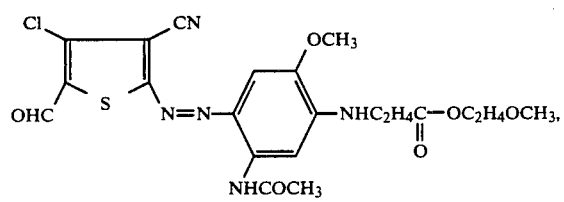

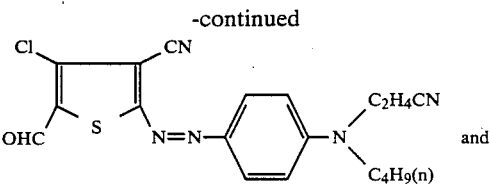

C.I. Disperse Red 54 : 1 in a weight ratio of 33 : 4.25 : 2.75,
b) the dyes

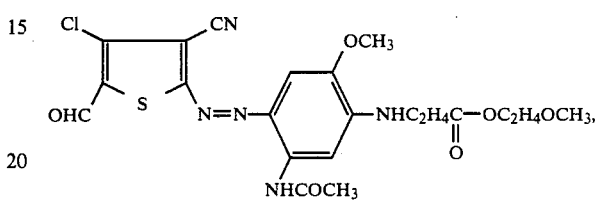

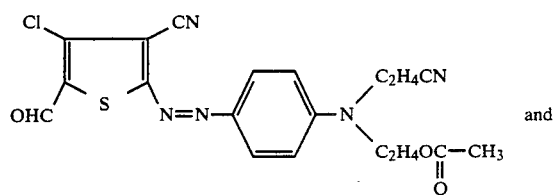

C.I. Disperse Red 54 : 1 in a weight ratio of 31 : 6.3 : 2.7
the dyes

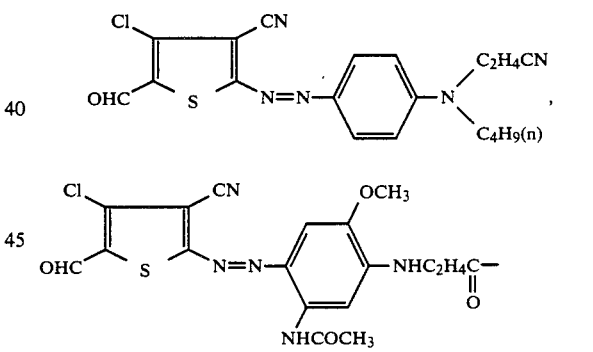

C.I. Disperse Red 167 : 1 in a weight ratio of 6.25 : 33.2 : 0.55 and
d) the dyes

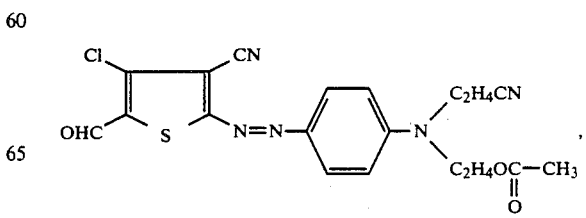

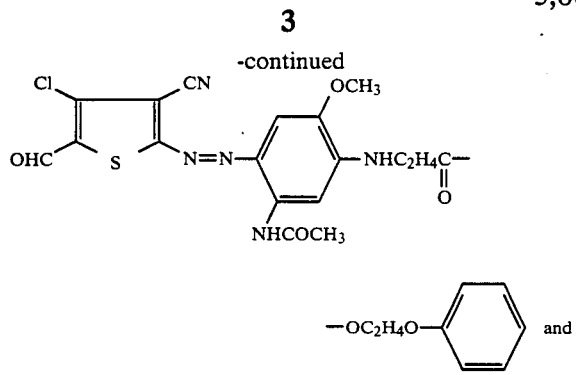

C.I. Disperse Red 167 : 1 in a weight ratio of 8 : 31.6 : 0.4.

Similar dye mixtures are described in earlier application EP-A-311 910.

The thiopheneazo dyes contained in the novel mixtures are known per se and described for example in EP-A-201 896. They dye polyester in brilliant violet to bluish green shades.

It is an object of the present invention to provide dye mixtures which dye polyester in navy to black shades.

We have found that this object is achieved by the dye mixtures defined in more detail at the beginning. It is surprising that by mixing the thiopheneazo dyes mentioned with yellow and/or orange and/or red dyes it is possible to obtain navy and black shades.

Any alkyl appearing in the abovementioned formula concerning the thiopheneazo dyes can be either straight-chain or branched.

If substituted phenyl appears in the formula of the thiopheneazo dyes, suitable substituents are for example $C_1$-$C_4$-alkyl, $C_1$-$C_4$-alkoxy and halogen, unless otherwise stated.

If alkyl interrupted by one or more oxygen atoms appears in the formula of the thiopheneazo dyes, preference is given to those radicals which are interrupted by one or two oxygen atoms.

If substituted alkyl appears in the formula of the thiopheneazo dyes, it can be monosubstituted or disubstituted and the substituents can be identical or different.

$R^2$, X and Y are each for example methoxy, ethoxy, propoxy, isopropoxy, butoxy, isobutoxy or sec-butoxy.

$R^2$ is further for example pentyloxy, isopentyloxy, neopentyloxy, tert-pentyloxy, hexyloxy, heptyloxy, octyloxy, 2-ethylhexyloxy, fluorine, chlorine, bromine, phenoxy, 2-chlorophenoxy, 4-chlorophenoxy, 4-methylphenoxy, 4-methoxyphenoxy, methylthio, ethylthio, propylthio, isopropylthio, butylthio, isobutylthio, pentylthio, isopentylthio, hexylthio, methylsulfonyl, ethylsulfonyl, propylsulfonyl, isopropylsulfonyl or butylsulfonyl.

X and Y are each further for example, like $R^4$, methyl, ethyl, propyl, isopropyl, butyl, isobutyl, secbutyl or tert-butyl.

$R^3$ is for example methoxycarbonyl, ethoxycarbonyl, propoxycarbonyl, isopropoxycarbonyl, butoxycarbonyl, isobutoxycarbonyl,sec-butoxycarbonyl,pentyloxycarbonyl, isopentyloxycarbonyl, neopentyloxycarbonvl, tert-pentyloxycarbonyl, hexyloxycarbonyl, 2-methoxyethoxycarbonyl, 2-ethoxyethoxycarbonyl, 2-propoxyethoxycarbonyl, 2-butoxyethoxycarbonyl, 2- or 3-methoxypropoxycarbonyl, 2- or 3-ethoxypropoxycarbonyl, 3,6-dioxaheptyloxycarbony1,3,6-dioxaoctyloxycarbonyl, methylcarbamoyl, ethylcarbamoyl, propylcarbamoyl, isopropylcarbamoyl, butylcarbamoyl, dimethylcarbamoyl, diethylcarbamoyl, dipropylcarbamoyl, dibutylcarbamoyl or N-methyl-N-ethylcarbamoyl.

$R^4$ is further for example pentyl, isopentyl, neopentyl, tert-pentyl, hexyl, 2-hydroxyethyl, 2- or 3-hydroxypropyl, 4-hydroxybutyl, 5-hydroxypentyl, 6-hydroxyhexyl, 2-methoxyethyl, 2-ethoxyethyl, 2-propoxyethyl, 2-butoxyethyl, 2-cyanoethyl, 2-formyloxyethyl, 2-acetyloxyethyl, 2-propionyloxyethyl, 2-butyryloxyethyl, 4-acetyloxybutyl, 2-methoxycarbonyloxyethyl, 2-methylaminocarbonyloxyethyl, 2-ethylaminocarbonyloxyethyl, 2-propylaminocarbonyloxyethyl or 2-butylaminocarbonyloxyethyl.

$R^4$ and $R^5$ are each further for example benzyl, 1- or 2-phenylethyl, 2-methoxycarbonylethyl, 2-ethoxycarbonylethyl, 2-propoxycarbonylethyl, .2-isopropoxycarbonylethyl, 2-butoxycarbonylethvl-, 2-isobutoxycarbonylethyl, 2-sec-butoxycarbonylethyl, 2-(2-chloroethoxycarbonyl)ethyl, 2-(2-hydroxyethoxycarbonyl)ethyl, 2-(2-methoxyethoxycarbonyl)ethyl, 2-(2-ethoxyethoxycarbonyl)ethyl, 2-(2-propoxyethoxycarbonyl)ethyl, 2-(2isopropoxycarbonyl)ethyl, 2-(2-butoxyethoxycarbonyl)ethyl or 2-(2-phenoxyethoxycarbonyl)ethyl.

If X is NH—CO—$R^6$, $R^6$ is for example methyl, ethyl, propyl, isopropyl, butyl, methoxymethyl, ethoxymethyl, 1- or 2-methoxyethyl, 1- or 2-ethoxyethyl, phenoxymethyl, 1- or 2-phenoxyethyl, cyanomethyl, 2-cyanoethyl, 3-cyanopropyl, 4-cyanobutyl, hydroxymethyl, 1- or 2-hydroxyethyl, 2- or 3-hydroxypropyl, 4-hydroxybutyl, chloromethyl, 2-chloroethyl, formyloxymethyl, acetyloxymethyl, 2-formyloxyethyl, 2-acetyloxyethyl, 2-propionyloxyethyl, 2-butyryloxyethyl, 3-formyloxypropyl, 4-acetyloxybutyl, phenoxy, 2-methoxyphenoxy, 4-methoxyphenoxy, 4-ethoxyphenoxy or 4-isopropoxyphenoxy.

Dyes F which have an absorption maximum at a wavelength of from 390 to 520 nm belong for example to the class of the monoazo or disazo dyes, anthraquinones, methine dyes, quinophthalones, naphtholactam dyes, coumarin dyes or diphenylamine dyes.

Dyes F which belong to the class of the monoazo or disazo dyes are for example C.I. Disperse Yellow 3 (11 855), C.I. Disperse Yellow 5 (12 790), C.I. Disperse Yellow 7 (26 090), C.I. Disperse Yellow 60 (12 712), C.I. Disperse Yellow 103, C.I. Disperse Yellow 114, C.I. Disperse Yellow 119, C.I. Disperse Yellow 126, C.I. Disperse Yellow 163, C.I. Disperse Yellow 180, C.I. Disperse Yellow 181, C.I. Disperse Yellow 182, C.I. Disperse Yellow 183, C.I. Disperse Yellow 198, C.I. Disperse Yellow 204, C.I. Disperse Yellow 211, C.I. Disperse Yellow 218, C.I. Disperse Yellow 223, C.I. Disperse Yellow 224, C.I. Disperse Yellow 227, C.I. Disperse Yellow 230, C.I. Disperse Yellow 231, C.I. Disperse Yellow 235, C.I. Disperse Orange 3 (11 005), C.I. Disperse Orange 13 (26 080), C.I. Disperse Orange 29 (26 077), C.I. Disperse Orange 30 (11 119), C.I. Disperse Orange 31, C.I. Disperse Orange 49, C.I. Disperse Orange 53, C.I. Disperse Orange 55, C.I. Disperse Orange 85, C.I. Disperse Orange 139, C.I. Disperse Orange 149, C.I. Disperse Orange 151, C.I. Disperse Red 50, C.I. Disperse Red 54:1, C.I. Disperse Red 65 (11 228), C.I. Disperse Red 72 (11 114), C.I. Disperse Red 74, C.I. Disperse Red 135, C.I. Disperse Red 167, C.I. Disperse Red 167:1, C.I. Disperse Red 184, C.I. Disperse Red 203, C.I. Disperse Red 224 and C.I. Disperse Red 279. (These names and those mentioned hereinafter are the customary Color Index names of the dyes).

Dyes F which belong to the class of the anthraquinones are for example C.I. Disperse Yellow 51, C.I. Disperse Orange 11 (60 700), C.I. Disperse Red 60 (60 756), C.I. Disperse Red 91 and C.I. Disperse Red 92.

Dyes F which belong to the class of the methine dyes are for example C.I. Disperse Yellow 12, C.I. Disperse Yellow 31 (48 000), C.I. Disperse Yellow 49, C.I. Disperse Yellow 61 (48 005), C.I. Disperse Yellow 88, C.I. Disperse Yellow 89, C.I. Disperse Yellow 90 (48 007), C.I. Disperse Yellow 93, C.I. Disperse Yellow 99 (48 420), C.I. Disperse Yellow 109, C.I. Disperse Yellow 116, C.I. Disperse Yellow 118, C.I. Disperse Yellow 124, C.I. Disperse Yellow 125, C.I. Disperse Yellow 131, C.I. Disperse Yellow 138, C.I. Disperse Yellow 142, C.I. Disperse Yellow 200, C.I. Disperse Yellow 201, C.I. Disperse Yellow 210 and C.I. Disperse Orange 47.

Dyes which belong to the class of the quinophthalones are for example C.I. Disperse Yellow 54 (47 020) and C.I. Disperse Yellow 64 (47 023).

Dyes which belong to the class of the coumarins are for example C.I. Disperse Yellow 82 and C.I. Disperse Yellow 216.

A dye of the class of the naphtholactams is for example C.I. Disperse Yellow 215.

Dyes which belong to the class of the diphenylamines are for example C.I. Disperse Yellow 1 (10 345), C.I. Disperse Yellow 9 (10 375), C.I. Disperse Yellow 14 (10 340), C.I. Disperse Yellow 17 (10 349), C.I. Disperse Yellow 33 (10 337), C.I. Disperse Yellow 34, C.I. Disperse Yellow 42 (10 338), C.I. Disperse Yellow 59, C.I. Disperse Yellow 86 and C.I. Disperse Orange 15 (10 350).

Dyes F are further for example C.I. Disperse Yellow 83 and C.I. Disperse Orange 72.

Preference is given to dye mixtures which contain those dyes F which have an absorption maximum at wavelengths of from 400 to 520 nm, in particular of from 410 to 520 nm.

Preference is further given to dye mixtures which contain one or more thiopheneazo dyes of the above-mentioned formula where $R^1$ is formyl, $R^2$ is chlorine and $R^3$ is cyano or $C_1$-$C_4$-alkoxycarbonyl.

Preference is further given to dye mixtures which contain one or more dyes F of the class of the monoazo or disazo dyes or of the class of the quinophthalone dyes.

Particularly important navy and black dye mixtures are those which contain, as dyes F, C.I. Disperse Yellow 64, C.I. Disperse Yellow 114, C.I. Disperse Yellow 198, C.I. Disperse Orange 13, C.I. Disperse Orange 29, C.I. Disperse Orange 30, C.I. Disperse Orange 49, C.I. Disperse Red 54:1, C.I. Disperse Red 135 and C.I. Disperse Red 167:1.

In the dye mixtures according to the present invention, the proportion of thiopheneazo dyes should be from 60 to 99% by weight, based on the total weight of the thiopheneazo dyes and the dyes F in the mixture. Preference is given to those dye mixtures where the proportion of thiopheneazo dyes is from 65 to 99% by weight, based on the total weight of the thiopheneazo dyes and the dyes F in the mixture The proportion of dyes F is consequently from 1 to 40% by weight, preferably from 1 to 35% by weight, each percentage being based on the total weight of the thiopheneazo dyes and the dyes F in the mixture These percentages each relate only to the dyes; that is, any other components present are disregarded.

The dye mixtures according to the present invention are prepared by mixing the particular components in the stated weight ratio. If desired, the novel mixtures may contain further components, for example dispersants. It is also possible to mix ready-made preparations of the particular dye components.

The novel navy and black dye mixtures are suitable for dyeing and printing polyester fabrics They produce dyeings and prints in navy to black shades which are notable for a high light fastness The dyeing and printing methods are known per se. Further details may also be found in the Examples A further advantage of the dye mixtures according to the present invention is their safe occupational hygiene The following Examples further illustrate the invention:

Dyeing method 10 g of polyester fabric are introduced at 60° C. into 200 ml of dyeing liquor which contains Z % by weight of dye mixture on weight of fiber and which has been adjusted to pH 4.5 with acetic acid. The fabric is treated at 60° C for 5 minutes, the temperature of the liquor is then raised to 135° C in the course of 30 minutes, the liquor is maintained at that temperature for 60 minutes and it is then cooled down to 60° C in the course of 20 minutes.

Thereafter the dyed polyester fabric is reduction cleared by treating it at 65° C in 200 ml of liquor containing 5 ml/l of 32 % strength by weight sodium hydroxide solution, 3 g/l of sodium dithionite and 1 g/l of an adduct of 48 mol of ethylene oxide with 1 mol of castor oil for 15 minutes. Finally the fabric is rinsed, neutralized with dilute acetic acid, rinsed once more and dried.

The dye quantities listed in the table below each apply to the depth of navy stage 1.

| Components of mixture [g] | Mixture No. | | | | |
|---|---|---|---|---|---|
| | 1 | 2 | 3 | 4 | 5 |
| Cl-[thiophene(OHC,S)]-CN, N=N-C6H4-N(C2H4CN)(C2H5) | 4.2 | 4.9 | 5.0 | 4.5 | 5.1 |

-continued

| Components of mixture [g] | Mixture No. | | | | |
|---|---|---|---|---|---|
| | 1 | 2 | 3 | 4 | 5 |
| Dye structure 1 (Cl, CN, OHC, S, N=N, OCH₃, N(C₂H₄COOCH₃)₂, CH₃) | 33.5 | — | — | — | — |
| Dye structure 2 (Cl, CN, OHC, S, N=N, OCH₃, N(C₂H₅)(C₂H₄COOC₂H₅), NHCOCH₃) | — | 33.7 | — | — | — |
| Dye structure 3 (Cl, CN, OHC, S, N=N, OCH₃, NH—C₂H₄COOC₂H₅, NHCOCH₃) | — | — | 33.6 | — | — |
| Dye structure 4 (Cl, CN, OHC, S, N=N, OCH₃, NHC₂H₄C(O)—OC₂H₄O—phenyl, NHCOCH₃) | — | — | — | 33.8 | — |
| Dye structure 5 (Cl, CN, OHC, S, N=N, OCH₃, NHCH₂—CH(OH)—CH₂OC₄H₉(n), NHCOCH₃) | — | — | — | — | 33.7 |
| C.I. Disperse Red 167:1 | — | 1.4 | 1.4 | 1.7 | 1.2 |
| C.I. Disperse Yellow 64 | 2.3 | — | — | — | — |
| Dispersant based on ligninsulfonate | 60 | 60 | 60 | 60 | 60 |
| Amount Z of mixture used [% by weight on weight of fiber] | 2.70 | 3.00 | 3.70 | 3.50 | 3.40 |

We claim:

1. A navy or black dye mixture containing one or more thiopheneaxo dyes of the formula:

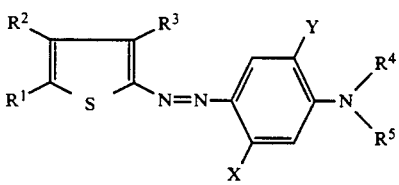

where $R^1$ is formyl, cyano or phenylsulfonyl, $R^2$ is halogen, $C_1$–$C_8$-alkoxy, substituted or unsubstituted phenoxy, $C_1$–$C_6$-alkylthio, phenylthio, $C_1$–$C_4$-alkylsulfonyl or phenylsulfonyl, $R^3$ is cyano, $C_1$–$C_6$-alkoxycarbonyl, whose alkyl chain may be interrupted by one or more oxygen atoms, carbamoyl or $C_1$–$C_4$-monoalkyl- or dialkyl-carbamoyl, $R^4$ is $C_1$–$C_6$-alkyl which may be substituted by hydroxyl, $C_1$–$C_4$-alkoxy, cyano, $C_1$–$C_4$-alkanoyloxy, $C_1$–$C_4$-alkoxycarbonyloxy, $C_1$–$C_4$-alkylaminocarbonyloxy, phenyl, $C_1$–$C_4$-alkoxycarbonyl or chlorine-, hydroxyl-, $C_1$–$C_4$-alkoxy- or phenoxy-substituted $C_1$–$C_4$-alkoxycarbonyl, $R^5$ is hydrogen or $C_1$–$C_6$-alkyl which is substituted by phenyl, $C_1$–$C_4$-alkoxycarbonyl or chlorine-, hydroxyl-, $C_1$–$C_4$-alkoxyl- or phenoxy-substituted $C_1$–$C_4$-alkoxycarbonyl, X is hydrogen, $C_1$–$C_4$-alkyl, $C_1$–$C_4$-alkoxy, chlorine, bromine or the radical —NH—CO—$R^6$, where $R^6$ is $C_1$–$C_4$-alkyl, which may be substituted by $C_1$–$C_4$-alkoxy, phenoxy, cyano, hydroxyl, chlorine or $C_1$–$C_4$-alkanoyloxy, or is unsubstituted or $C_1$–$C_4$-alkoxy-substituted phenoxy and Y is hydrogen, $C_1$–$C_4$-alkyl or $C_1$–$C_4$-alkoxy, and one or more dyes F selected from the group consisting of monoazo dyes, disazo dyes, anthraquinones, methine dyes, quinophthalones, naphtholactam dyes, coumarin dyes and diphenylamine dyes, said dyes F having an absorption maximum at a wavelength of from 390 to 520 nm, the proportion of the thiopheneazo dyes being from 60 to 99% by weight, based on the total weight of the thiopheneazo dyes and the dyes F in the mixture, except dye mixtures containing a) the dyes

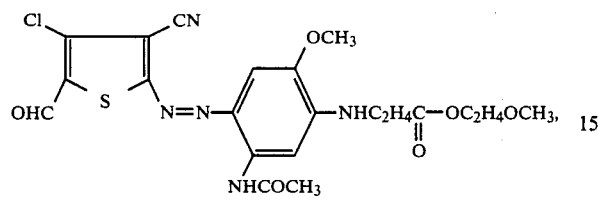

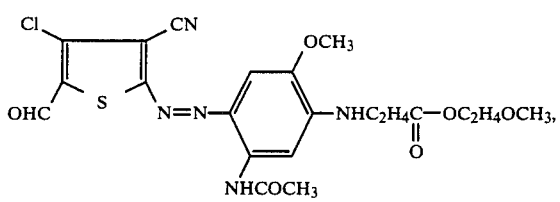

C.I. Disperse Red 54 : 1 in a weight ratio of 33 : 4.25 : 2.75, b) the dyes

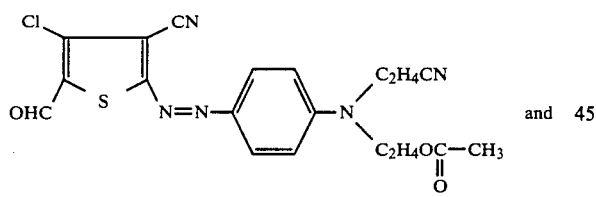

C.I. Disperse Red 54 : 1 in a weight ratio of 31 : 6.3 : 2.7, c) the dyes

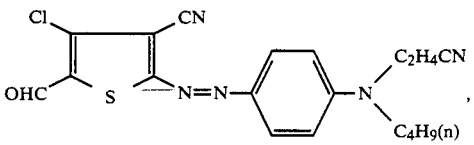

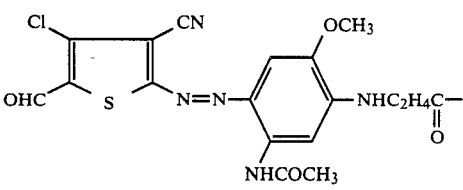

C.I. Disperse Red 167 : 1 in a weight ratio of 6.25 : 33.2 : 0.55 and d) the dyes

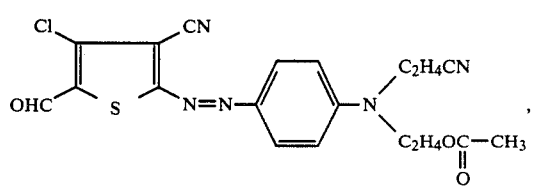

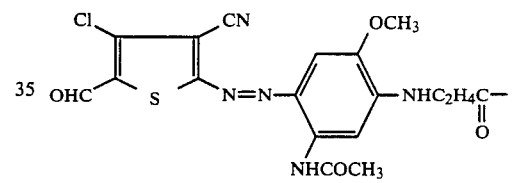

C.I. Disperse Red 167 : 1 in a weight ratio of 8 : 31.6 : 0.4.

2. A dye mixture as claimed in claim 1, wherein $R^1$ is formyl, $R^2$ is chlorine and $R^3$ is cyano or $C_1$-$C_4$-alkoxycarbonyl.

3. A dye mixture as claimed in claim 1, wherein the dyes F are of the class of the monoazo or disazo dyes or of the class of the quinophthalone dyes.

* * * * *